(12) United States Patent
Bratina et al.

(10) Patent No.: US 8,945,351 B2
(45) Date of Patent: *Feb. 3, 2015

(54) INDUCTION HEATED GASIFIER

(75) Inventors: James E. Bratina, Greenwood, IN (US);
David Bowering, Indianapolis, IN (US);
Anthony Kriech, Indianapolis, IN (US);
Perry Eyster, Brownsburg, IN (US);
Thomas Roberts, Noblesville, IN (US)

(73) Assignee: Heritage Environmental Services LLC, Indianapolis, IN (US)

( * ) Notice: Subject to any disclaimer, the term of this patent is extended or adjusted under 35 U.S.C. 154(b) by 813 days.

This patent is subject to a terminal disclaimer.

(21) Appl. No.: 13/191,019

(22) Filed: Jul. 26, 2011

(65) Prior Publication Data

US 2012/0027662 A1 Feb. 2, 2012

Related U.S. Application Data

(60) Provisional application No. 61/368,060, filed on Jul. 27, 2010.

(51) Int. Cl.
*C10J 3/00* (2006.01)
*B01D 3/08* (2006.01)
(Continued)

(52) U.S. Cl.
CPC . *C10J 3/007* (2013.01); *B01D 3/08* (2013.01); *C01B 31/18* (2013.01); *C10G 7/00* (2013.01);
(Continued)

(58) Field of Classification Search
CPC .............. B01D 3/08; B09B 3/00; B09B 5/00; B08B 7/0071; C10M 175/0033; C10G 1/02; C10G 7/00; C01B 31/18; C01B 31/20; C01B 2203/0222; C10J 3/00; C10J 3/007; C10J 2300/12; C10J 2300/1269

USPC ...................... 203/87, 99, 100; 208/184, 347; 198/657; 202/118; 34/247; 588/301, 588/405, 410; 423/418.2, 437.1; 48/197 R
See application file for complete search history.

(56) References Cited

U.S. PATENT DOCUMENTS 3,642,135 A 2/1972 Borden
3,821,106 A 6/1974 Borden
(Continued)

FOREIGN PATENT DOCUMENTS

JP 9-155326 A 6/1997
JP 2003014216 * 1/2003 ............... F23G 5/27
(Continued)

OTHER PUBLICATIONS

International Search Report and Written Opinion from corresponding PCT application No. PCT/US2011/045352 dated Mar. 28, 2012 (8 pgs).
(Continued)

*Primary Examiner* — Nina Bhat
*Assistant Examiner* — Jonathan Miller
(74) *Attorney, Agent, or Firm* — Brinks Gilson & Lione

(57) ABSTRACT

A method of removing organic components from a mixture containing organic and inorganic components which method involves providing an induction heated screw conveyor having an auger and passing the mixture through the induction heated screw conveyor while inductively heating the auger so as to heat the mixture in the induction heated screw conveyor primarily from the center of the induction heated screw conveyor. The mixture is heated to a temperature that is sufficient to cause the organic components in the mixture to separate from the mixture as a vapor. The oxygen concentration in the induction heated screw conveyor is controlled so as to gasify the organic components. The gasified organic components are removed and the remaining inorganic components are collected.

12 Claims, 1 Drawing Sheet

(51) Int. Cl.
    *C01B 31/18*     (2006.01)
    *C10G 7/00*     (2006.01)
    *C01B 31/20*     (2006.01)
    *C10M 175/00*     (2006.01)

(52) U.S. Cl.
    CPC .......... C01B 31/20 (2013.01); C10M 175/0033 (2013.01); *C10J 2300/1269* (2013.01); *Y10S 203/11* (2013.01)
    USPC ............. 203/87; 203/100; 202/118; 208/184; 198/657; 34/247; 423/418.2; 423/437.1; 48/197 R

(56) References Cited

U.S. PATENT DOCUMENTS

| | | | | |
|---|---|---|---|---|
| 3,942,455 | A * | 3/1976 | Wallis | 110/257 |
| 3,963,582 | A * | 6/1976 | Helm et al. | 201/2 |
| 4,304,609 | A * | 12/1981 | Morris | 134/19 |
| 4,453,319 | A * | 6/1984 | Morris | 34/247 |
| 4,778,626 | A | 10/1988 | Ramm | |
| 5,036,170 | A * | 7/1991 | Arabei et al. | 219/651 |
| 5,129,995 | A * | 7/1992 | Agarwal | 201/21 |
| 5,144,108 | A * | 9/1992 | Passarotto | 219/634 |
| 5,385,749 | A | 1/1995 | Serpelloni et al. | |
| 5,632,863 | A | 5/1997 | Meador | |
| 5,679,398 | A | 10/1997 | Serpelloni et al. | |
| 5,710,360 | A | 1/1998 | Self et al. | |
| 5,869,810 | A * | 2/1999 | Reynolds et al. | 219/388 |
| 6,226,889 | B1 * | 5/2001 | Aulbaugh et al. | 34/424 |
| 6,462,334 | B1 * | 10/2002 | Little et al. | 250/281 |
| 6,487,843 | B1 | 12/2002 | Tomczyk | |
| 6,840,712 | B2 | 1/2005 | Satchwell et al. | |
| 7,028,746 | B2 | 4/2006 | Akers et al. | |
| 8,220,178 | B2 * | 7/2012 | Schellstede | 34/247 |
| 8,282,787 | B2 * | 10/2012 | Tucker | 201/41 |
| 8,647,401 | B2 * | 2/2014 | Self et al. | 48/89 |
| 8,784,616 | B2 * | 7/2014 | Tucker | 201/32 |
| 2002/0170696 | A1 | 11/2002 | Akers et al. | |
| 2003/0228196 | A1 | 12/2003 | Satchwell et al. | |
| 2006/0096119 | A1 * | 5/2006 | Schellstede | 34/523 |
| 2007/0204512 | A1 * | 9/2007 | Self et al. | 48/197 FM |
| 2008/0136066 | A1 | 6/2008 | Taylor et al. | |
| 2009/0004318 | A1 | 1/2009 | Taylor et al. | |
| 2009/0179064 | A1 | 7/2009 | Lee et al. | |
| 2009/0249641 | A1 | 10/2009 | Graham et al. | |
| 2009/0281202 | A1 | 11/2009 | Eyster et al. | |

FOREIGN PATENT DOCUMENTS

| | | | |
|---|---|---|---|
| JP | 2004-239687 A | 8/2004 | |
| SU | 1162851 | * 6/1985 | ............... C10F 7/06 |

OTHER PUBLICATIONS

International Preliminary Report on Patentability and Written Opinion from corresponding PCT application No. PCT/US2011/045352 dated Feb. 7, 2013 (5 pgs).

* cited by examiner

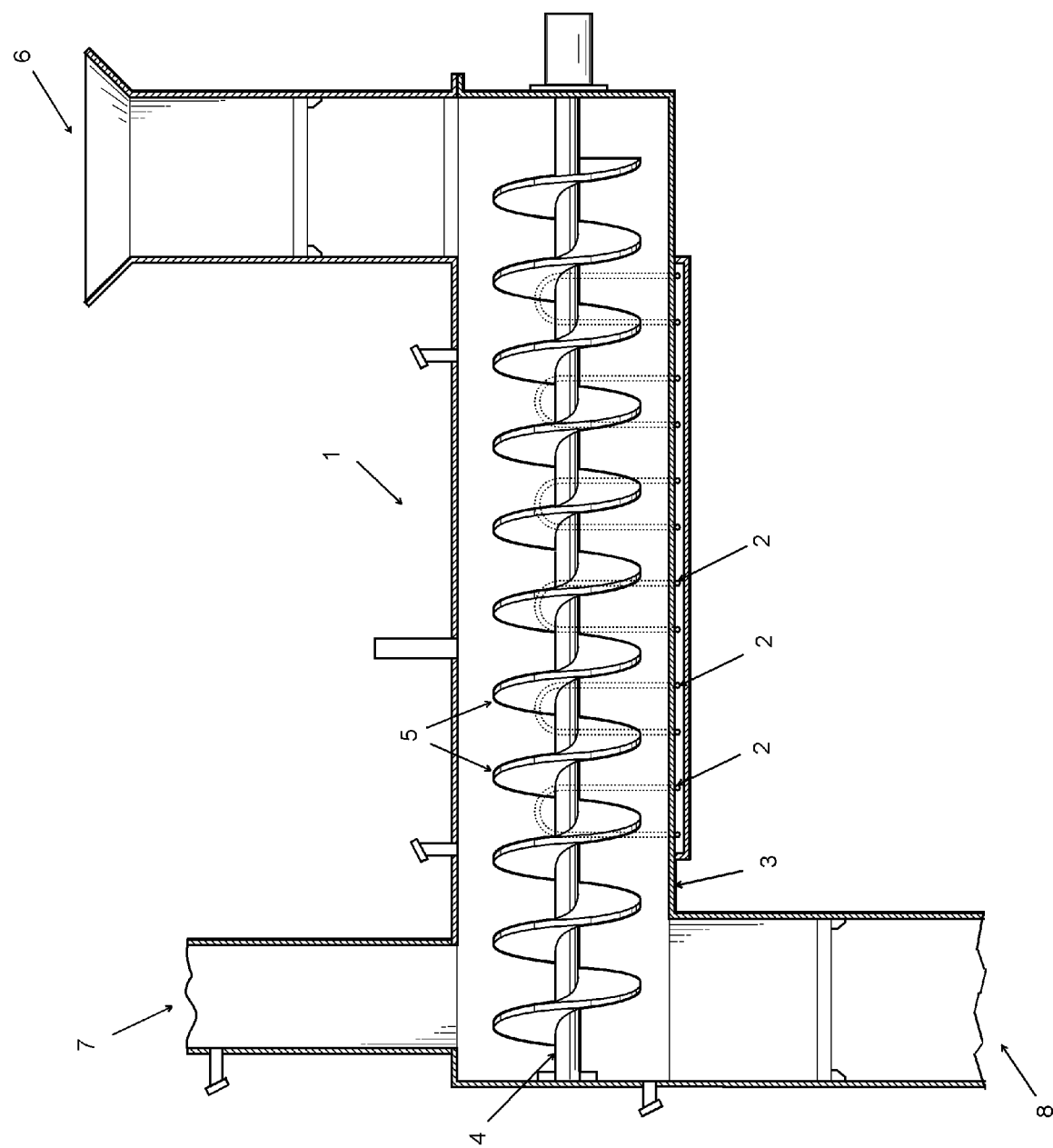

INDUCTION HEATED GASIFIER

RELATED APPLICATION

The present application is based upon U.S. Provisional Patent Application Ser. No. 61/368,060, filed Jul. 27, 2010, and claims priority thereto under 35 U.S.C. §120. The entire specification of U.S. Provisional Patent Application Ser. No. 61/368,069 is hereby expressly incorporated by reference.

BACKGROUND

The present invention relates generally to separating components from a mixture containing a combination of organic and inorganic materials. More particularly the present invention is directed to a process and apparatus for removing organic components from a mixture containing a combination of organic and inorganic materials, which process and apparatus involves the use of an induction heated screw mechanism.

Waste materials can be processed to remove organics therefrom. Hydrocarbons can be removed from waste materials using a variety of different apparatus including incinerators, boilers, cement kilns and other combustion devices. The ability of these apparatus/devices to process wastes materials and remove organics economically is limited by the concentration of any organics in the waste materials and the compatibility of the inorganic materials with the apparatus/device that is used to process the waste material. Any inorganic material(s) present in the waste material usually cannot be recovered for reuse even if such inorganic material(s) have some reuse value. Often the only option available for processing these waste materials is to either incinerate them at a high cost or to dispose of them in a landfill.

The following U.S. patents exemplify various systems and process that use inductive thermal screw mechanisms: U.S. Pat. No. 3,642,135 to Borden, U.S. Pat. No. 3,821,106 to Borden, U.S. Pat. No. 5,385,749 to Serpelloni et al., U.S. Pat. No. 5,632,863 to Meador, U.S. Pat. No. 5,679,398 to Serpelloni et al., U.S. Pat. No. 5,710,360 to Self et al., U.S. Pat. No. 6,487,843 to Tomczyk, U.S. Pat. No. 6,840,712 to Satchwell et al., and U.S. Pat. No. 7,028,746 to Akers et al. The following published pending U.S. patent applications also exemplify various systems and process that use inductive thermal screw mechanisms: 2002/0170696 to Akers et al., 2003/0228196 to Satchwell et al., 2008/0136066 to Taylor et al., 2009/0004318 to Taylor et al., 2009/0179064 to Lee et al., 2009/0249641 to Graham et al., 2009/0281202 to Eyster et al.

The present invention provides a process and apparatus for separating two or more components from a mixture containing a combination of organic and inorganic materials, which process and apparatus involves the use of an induction heated screw mechanism.

BRIEF SUMMARY

According to various features, characteristics and embodiments of the present invention which will become apparent as the description thereof proceeds, the present invention provides a method of removing organic components from a mixture containing organic and inorganic components which method involves:

providing an induction heated screw conveyor having an auger;

passing the mixture through the induction heated screw conveyor while inductively heating the auger so as to heat the mixture in the induction heated screw conveyor primarily from the center of the induction heated screw conveyor;

allowing the organic components in the mixture to gasify and separate from the mixture as a vapor; and removing the gasified organic components.

BRIEF DESCRIPTION OF THE DRAWINGS

The present invention will be described with reference to the attached drawing which is given as a non-limiting example only, in which:

FIG. 1 is a cross-sectional view of an induction heated thermal screw conveyor according to one embodiment of the present invention.

DETAILED DESCRIPTION OF THE DRAWINGS AND THE PRESENTLY PREFERRED EMBODIMENTS

The present invention is directed to a process and apparatus for separating components from a mixture containing a combination of organic and inorganic materials. More particularly the present invention is directed to a process and apparatus for separating two or more components from a mixture containing a combination of organic and inorganic materials, which process and apparatus involves the use of an induction heated screw mechanism.

The reference herein to a "component" or "components" includes both organic and inorganic chemical components, including components that are mixed, reacted, or combined together in any manner.

The reference herein to a "mixture" or "mixtures" is not limited to any particular type or combination of physical phases. Accordingly liquid-liquid mixtures, liquid-solid mixtures and solid-solid mixtures, including suspensions, solutions, colloids, heterogeneous mixtures, homogeneous mixtures, etc. can be processed according to the present invention. Moreover components of the mixture can include inert components or compounds, volatile components or compounds, reactive components or compounds, etc.

According to the present invention the organic portion or components of the material mixtures can be driven out of the material mixture by heating and gasifying to form gases that can be released and drawn away from the inorganic portion or components of the material mixtures in a gasifier system. The gasifier system used according to the present invention comprises an induction heated screw conveyor. After processing and removing the organic portion or components, the remaining inorganic portion or components of the material mixture can be reused.

The present invention provides a process and apparatus for the heating of waste materials containing organic and inorganic materials to a temperature at which a controlled amount of air (or oxygen) can be added to gasify the organic compounds in the material. By controlling the oxygen level in the processing unit, the organics can be gasified or partially combusted into CO (carbon monoxide), $H_2$ (hydrogen) and $CH_4$ (methane) while maintaining a reducing atmosphere in the reaction zone. Gasification thus involves partial combustion of the organic materials to form gaseous products that can be drawn away from the inorganic portion or components of the material mixtures. After the organic compounds are removed, the remaining inorganic portion of the material can be recovered for reuse.

According to the present invention the use of an induction heated screw conveyor provides an extremely efficient thermal manner of processing materials that cannot be processed by equipment such as incinerators, boilers, cement kilns and other combustion devices.

The induction heated screw conveyor of the present invention functions to both heat and transfer materials through the mechanism.

According to one embodiment, the present invention provides for the removal of organics from wastes that are a mixture of organic and inorganic materials by gasification. The organic portion of the materials are gasified and removed as gases from the unit, while the inorganic portion is removed from the unit as a solid that can be reused. The use of the induction heated screw conveyor allows indirect heat to be applied to the material by heating the auger in the center of the screw conveyor. The auger in the screw conveyor transfers the heat into the material being heated. In another embodiment of the present invention the wall(s) of the screw conveyor could also be heated inductively together with or separately from the auger by selecting appropriate materials of construction that either do not become inductively heated or do become inductively heated. The heating allows the temperature of the material to increase to the point where gasification will occur in the unit. If a controlled amount of oxygen is added to the unit (to maintain a reducing atmosphere), the hydrocarbons will be gasified to produce a low BTU gas that contains CO (carbon monoxide) along with other gasified elements or components. This low BTU gas allows the unit to operate as a gasified that can provide fuel for other processes, such as boilers, burners or generators. If more oxygen is added to the unit, the CO will be oxidized to $CO_2$ and the gases leaving the unit will contain no fuel value. In either case, the inorganic portion of the material can be recovered for reuse.

The induction heated thermal screw of the present invention can be built on a variety of scales allowing it to be used directly at locations where waste materials are being produced. Providing appropriately sized processing units on site, particularly for relatively small applications will minimize the transportation of materials being processed and associated costs. The induction heated thermal screw conveyor of the present invention also has a small number of parts and support equipment that reduce its initial capital cost and reduces the maintenance complexity compared to other waste processing equipment. The processing of waste materials at a location where the waste materials are produced may also present additional opportunities for the reuse of the recovered inorganic materials back into the processes that produced the waste materials. Also, the location producing the waste materials may have a need for the low BTU gas than can be used as a fuel or supplemental fuel in boilers, heaters or other devices.

The use of the induction heated screw conveyor according to the present invention allows indirect heat to be applied to the material by heating the auger in the center of the screw conveyor. The auger in the screw conveyor transfers the heat into the material being heated. This heating can crack larger organic components, volatilize the resulting and other smaller hydrocarbon components and other organic materials to remove them from the material being treated. Inorganic components that remain after the organic components are removed can be collected. The operating temperature of this invention is limited only by the temperature that can be attained by the materials of construction for the auger in the induction heated screw conveyor.

FIG. 1 is a schematic view of an induction heated thermal screw conveyor according to one embodiment of the present invention. As depicted in FIG. 1 the invention consists of a fairly conventional induction heated screw conveyor 1 that is wrapped with one or more induction heating coils 2. The induction heating coils 2 are wrapped around the trough section 3 of the screw conveyor 1. An insulator material (not shown) is positioned between the induction heating coils 2 and the trough 3 to both insulate the unit and to prevent the induction heating coils 2 from short circuiting. The induction heating coils 2 are primarily provided to heat the auger 4, including the metal flights 5 of the auger 4 in the screw conveyor 1, while only providing a limited amount of energy to heat the screw conveyor trough 3.

This targeted or selective heating of the auger 4 is accomplished by fabricating the auger 4 from materials that are more susceptible to induction heating, such as ferrous materials, including iron and alloys of iron, and fabricating the trough section 3 from materials that are less susceptible to induction heating, such as stainless steel.

As the auger 4 in the screw conveyor 1 is heated, heat is transferred from the auger 4 to the material being transported in/by the conveyor system. The material in the screw conveyor 1 is transported by the rotation of the auger 4 which causes the flights 5 to push material through the screw conveyor 1. The high surface area of the screw conveyor system, including the flights 5, and the movement of the material being treated through the system provide an extremely efficient transfer of heat. In particular the material is predominately heated at or from the center of the screw conveyor where the auger is located rather than at or from the sides of the trough. This manner of heating greatly limits heat loses from the trough to the ambient environment. The operating temperature of the system is limited only by the materials of construction. As long as the components of the screw conveyor can withstand the operating temperature without malfunctioning, the system can operate.

In FIG. 1 a feed material mixture is fed into the screw conveyor 1 through inlet 6, as the material mixture moves through the screw conveyor and is heated, organic components are gasified as discussed herein. The oxidized organic components are drawn off and out of the screw conveyor through outlet 7. The remaining portion of the material mixture, i.e. the inorganic portion, is removed through outlet 8.

According to the present invention the induction heated screw conveyor is sealed off from the ambient environment so that the atmosphere within the induction heated screw conveyor can be controlled in respect to the amount of oxygen that is fed into or allowed to enter into the screw conveyor. As noted above, the amount of oxygen fed into or allowed to enter into the screw conveyor should be sufficient to gasify hydrocarbons in the organic components into CO (and/or $CO_2$) and $H_2$. According to one embodiment the amount of oxygen can be controlled to convert carbon into CO rather than $CO_2$ so as to retain some heat value in the gases drawn out so that the gases can be used as a fuel or supplemental fuel.

FIG. 1 illustrates the trough of the screw conveyor as being horizontal. In other embodiments of the present invention, the trough of the screw conveyor can be inclined with the vapor recovery outlet at an upper end or point in the screw conveyor system.

It is also within the present invention to either uniformly heat the screw conveyor along the length thereof or to heat different sections of the screw conveyor to different temperatures.

In an operation that separates higher boiling hydrocarbons and/or other volatile materials or components from a feed material mixture, as the higher boiling hydrocarbons and/or other volatile materials or components are drive off or out of the mixture in the induction heated screw system, they move into the space above the screw flights. The vapors in the space above the screw flight can be drawn off by for collection and subsequent treatment, recovery or destruction as desired.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A method of removing organic components from a mixture containing organic and inorganic components which method comprises:
providing an induction heated screw conveyor having an auger; passing the mixture through the induction heated screw conveyor while inductively heating the auger so as to heat the mixture in the induction heated screw conveyor primarily from the center of the induction heated screw conveyor;
allowing the organic components in the mixture to gasify and separate from the mixture as a vapor; and
removing the gasified organic components,
wherein the mixture is heated to a temperature of 600° F. or greater.

2. A method of removing organic components from a mixture containing organic and inorganic components according to claim 1, further comprising the step of controlling the oxygen concentration in the induction heated screw conveyor so as to gasify carbon from the organic components into carbon dioxide.

3. A method of removing organic components from a mixture containing organic and inorganic components according to claim 1, further comprising the step of controlling the oxygen concentration in the induction heated screw conveyor so as to gasify carbon from the organic components into carbon monoxide.

4. A method of removing organic components from a mixture containing organic and inorganic components according to claim 1, wherein the inorganic components that remain after the organic components are removed are collected.

5. A method of removing organic components from a mixture containing organic and inorganic components according to claim 1, wherein the mixture comprises a solid phase.

6. A method of removing organic components from a mixture containing organic and inorganic components according to claim 1, wherein the mixture comprises a waste material.

7. A method of removing organic components from a mixture containing organic and inorganic components according to claim 1, wherein the induction heated thermal screw is sealed off from the ambient atmosphere.

8. A method of removing organic components from a mixture containing organic and inorganic components according to claim 1, wherein a portion of the organic compounds are gasified after being separated from the mixture.

9. A method of removing organic components from a mixture containing organic and inorganic components according to claim 1, wherein a portion of the organic compounds are gasified before being separated from the mixture.

10. A method of removing organic components from a mixture containing organic and inorganic components according to claim 1, wherein a portion of the organic compounds in the mixture are thermally cracked by the heating.

11. A method of removing organic components from a mixture containing organic and inorganic components according to claim 1, wherein the removed gasified organic components are removed as a gas that has a combustible heat value.

12. A method of removing organic components from a mixture containing organic and inorganic components according to claim 1, wherein the inorganic components that remain after the organic components are removed are recycled.

* * * * *

UNITED STATES PATENT AND TRADEMARK OFFICE
CERTIFICATE OF CORRECTION

| | | |
|---|---|---|
| PATENT NO. | : 8,945,351 B2 | Page 1 of 1 |
| APPLICATION NO. | : 13/191019 | |
| DATED | : February 3, 2015 | |
| INVENTOR(S) | : James E. Bratina et al. | |

It is certified that error appears in the above-identified patent and that said Letters Patent is hereby corrected as shown below:

<u>In the Specification</u>

In column 1, line 9, under Related Application, delete "61/368,069" and substitute --61/368,060-- in its place.

Signed and Sealed this
Twentieth Day of October, 2015

Michelle K. Lee
*Director of the United States Patent and Trademark Office*